United States Patent [19]

Hayes

[11] 4,263,994

[45] Apr. 28, 1981

[54] STEERING MECHANISM

[75] Inventor: Robert R. Hayes, Cleveland, Ohio

[73] Assignee: Polytechniques, Inc., Solon, Ohio

[21] Appl. No.: 83,157

[22] Filed: Oct. 9, 1979

[51] Int. Cl.[3] .............................................. F16D 67/00

[52] U.S. Cl. ............................... 192/8 R; 114/144 R; 188/67

[58] Field of Search ......................... 192/8 R; 188/67; 114/144 R

[56] References Cited

U.S. PATENT DOCUMENTS

| | | | |
|---|---|---|---|
| 1,187,860 | 6/1916 | Phelps | 192/8 R |
| 1,471,398 | 10/1923 | Inglis | 192/8 R |
| 2,458,441 | 1/1949 | Starkey | 192/8 C |
| 2,863,536 | 12/1958 | Cole, Jr. | 192/8 |
| 2,883,016 | 4/1959 | Wassilieff | 192/8 |
| 2,927,551 | 3/1960 | Bevis et al. | 115/18 |
| 2,946,417 | 7/1960 | Hungerford, Jr. | 192/8 |
| 2,947,278 | 8/1960 | Magill et al. | 115/18 |
| 3,039,420 | 6/1962 | Bevis et al. | 115/18 |
| 3,080,953 | 3/1963 | Edgemond, Jr. | 192/8 R |
| 3,135,130 | 6/1964 | Bentley | 74/485 |
| 3,184,991 | 5/1965 | Bomberger | 74/507 |
| 3,208,300 | 9/1965 | Morse | 74/498 |
| 3,796,292 | 3/1974 | Harrison | 192/8 C |

FOREIGN PATENT DOCUMENTS

| | | | |
|---|---|---|---|
| 1478099 | 6/1977 | United Kingdom | 192/8 R |

*Primary Examiner*—Allan D. Herrmann
*Attorney, Agent, or Firm*—Pearne, Gordon, Sessions, McCoy & Granger

[57] ABSTRACT

A bidirectional steering mechanism is disclosed for a vehicle such as a motor boat wherein a manually steerable wheel is connected through the steering mechanism to steer an outboard motor; however, wave action or torque reaction from the motor cannot act in an opposite direction through the steering mechanism to the wheel. This provides a non-kickback steering control mechanism. The steering mechanism has first, second and third elongated members, the first connected to the steering wheel, the second connected to the outboard motor, and the third restrained against longitudinal movement. Wedge means and lock means act between the second and third members as urged by spring means with trip surfaces movable with the first member to relatively unlock the second and third members after a first lost motion distance and then actuator means acts after a greater second lost motion distance to move the second member from the first member. The foregoing abstract is merely a resume of one general application, is not a complete discussion of all principles of operation or applications, and is not to be construed as a limitation on the scope of the claimed subject matter.

10 Claims, 5 Drawing Figures

STEERING MECHANISM

BACKGROUND OF THE INVENTION

Steering mechanisms for vehicles such as boats have included many different forms and include bidirectional control systems which preclude or attempt to preclude any kickback or reaction from the motor to the steering wheel. In most cases, such steering mechanisms for vehicles have utilized a rotary bidirectional device which generally requires a large diameter hub for the steering wheel and is one which is relatively complex and costly to manufacture. Such devices are not easily retrofitted on an existing vehicle because of the need for a special wheel hub, and hence, are not suitable for after-market sales and use. Still others are built into the pivot of the outboard motor itself and likewise are not suitable for after-market sale and use.

Other bidirectional no-kickback mechanisms are ones wherein the locking wedges may lock too tightly and there is chatter or jamming upon attempted release for movement in a given direction, especially with an overhauling load.

Accordingly, the problem to be solved is how to provide a steering mechanism which may be added to an existing vehicle and which will provide a bidirectional no-kickback drive.

SUMMARY OF THE INVENTION

This problem is solved by a steering mechanism for a vehicle comprising, in combination, a steering control, a first elongated member connected by linkage to be moved generally longitudinally by movement of said steering control, a second elongated member at least partially longitudinally movable relative to said first member, a steering output connected to said second member and connected to steer the vehicle, a third elongated member extending longitudinally relative to said second member, linkage means connected to the vehicle to restrain said third member from longitudinal movement, wedge means having first and second oppositely sloping wedge surfaces, lock means, including at least one lock element, disposed to engage said first and second wedge surfaces, spring means acting in a generally longitudinal direction and relatively urging into engagement said lock means and said first and second wedge surfaces to relatively transversely wedge between said second and third elongated members to frictionally lock together said second and third members, first and second oppositely disposed trip surfaces movable longitudinally with said first member and engageable, after moving a first lost motion distance, to relatively unlock said wedge means and lock means between said second and third members, and actuator surfaces acting between said first and second members and engageable upon said first member longitudinally moving a second lost motion distance, which is greater than said first lost motion distance, whereby movement in a first direction of said steering control moves said first member in a first direction with said first trip surface moving through said first lost motion distance to unlock said second and third members and said actuator surfaces relatively moving through said second lost motion distance to thereafter move said second member in said first direction, and whereby movement in a second direction of said steering control moves said first member in a second direction with said second trip surface moving through said first lost motion distance to unlock said second and third members and said actuator surfaces relatively moving through said second lost motion distance to thereafter move said second member in said second direction.

An object of the invention is to provide a bidirectional no-kickback steering control mechanism which may be added to an existing vehicle.

Another object of the invention is to provide a bidirectional no-kickback steering mechanism which utilizes longitudinally disposed members.

Another object of the invention is to provide a steering mechanism with wedge and lock means coacting between second and third relatively longitudinally movable members and with trip means acting upon relative longitudinal movement between the first member and the second member Other objects and a fuller understanding of the invention may be had by referring to the following description and claims, taken in conjunction with the accompanying drawing.

DESCRIPTION OF THE PREFERRED EMBODIMENT

Figure 1:
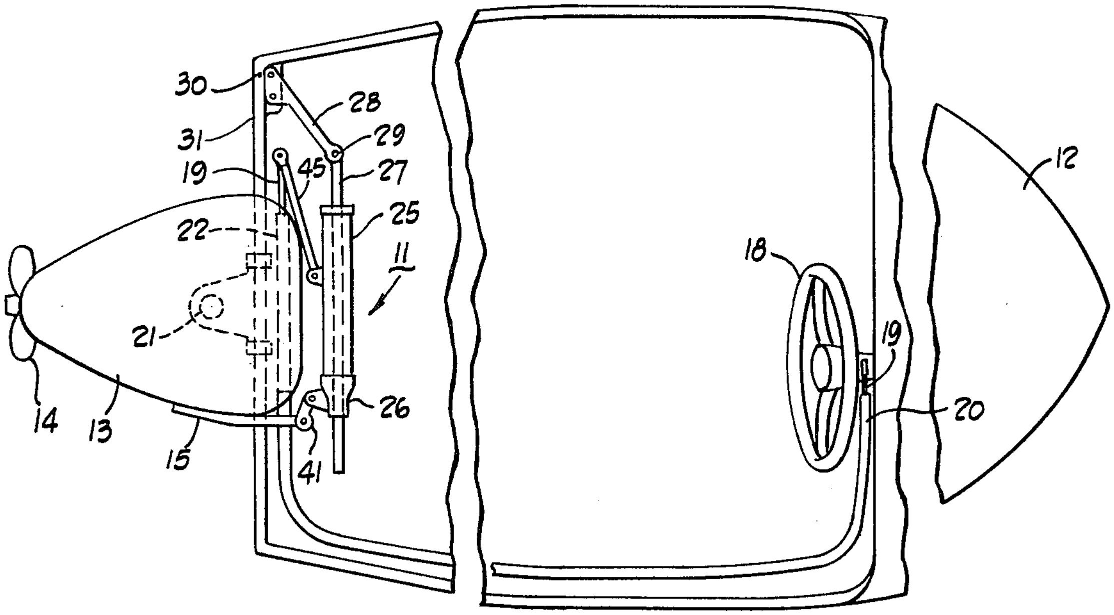
FIG. 1 is a plan view of a boat utilizing the steering mechanism of the present invention.

The drawings show the steering mechanism 11 which may be used with a steerable vehicle, for example, a boat 12 having a steerable propulsion system such as an inboard/outboard drive, or, as shown, an outboard motor 13. Such motor has a propeller 14 and a steering tiller 15. Some steering control mechanism is provided in the boat 12 and this may be a steering wheel 18. The turning of the wheel 18 pushes or pulls on a steering cable 19 which is provided within a stationary sheath 20. Moving the steering tiller 15 moves the outboard motor 13 about a vertical pivot 21 and a horizontal pivot tube 22 is provided about which the motor 13 may be tilted upwardly, for example, when in shallow water.

Figure 2:
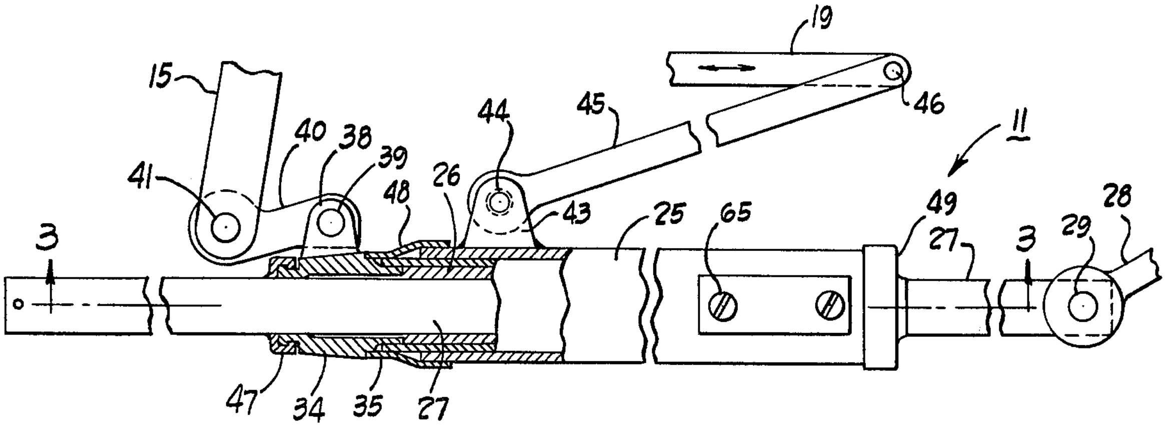
FIG. 2 is an enlarged plan view of the steering mechanism.
Figure 3:
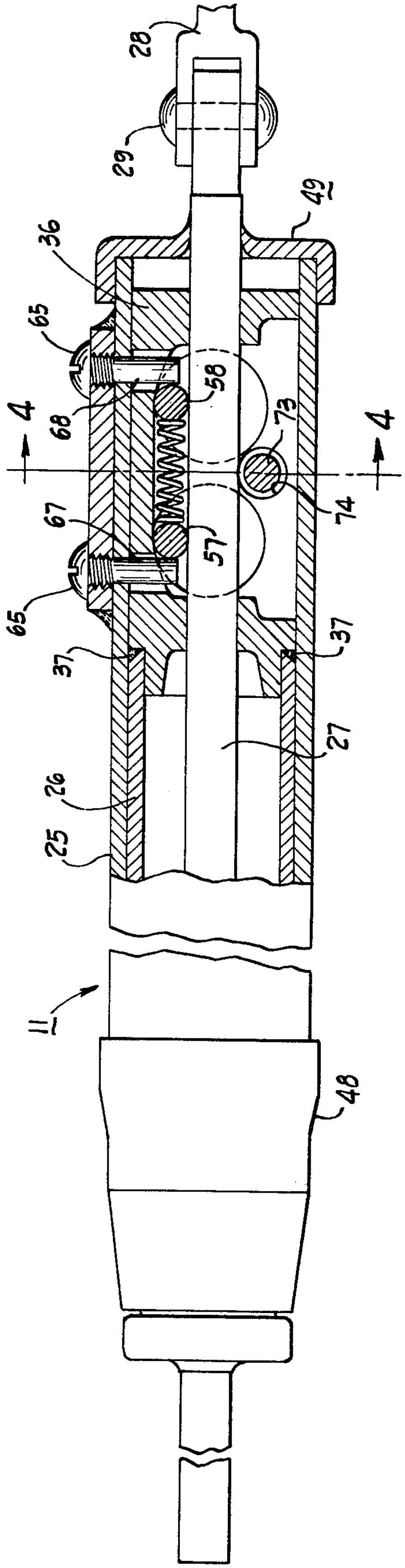
FIG. 3 is a sectional view on line 3—3 of FIG. 2.

The steering mechanism 11 is shown in FIG. 1 and is shown enlarged in FIGS. 2 and 3. In general, this steering mechanism 11 includes first, second and third elongated members 25, 26 and 27, respectively. The longitudinal extent of these members is all generally parallel, and in the preferred embodiment, the third member 27 is an elongated bar which is restrained against longitudinal movement by means of link 28 pivoted at 29 to one end of the bar 27 and rigidly connected at 30 at the other end to a fixed part of the vehicle, for example, the transom 31. The second and third elongated members in this embodiment are tubular with one telescoping within the other.

In the preferred embodiment, the second elongated member 26 is an inner sleeve surrounding the third elongated member 27, which is a bar, and the first elongated member is an outer tube surrounding the inner tube 26. An end member 34 is secured, as by welding 35, to one end of the inner tube 26 and an actuator block 36 is secured, as by welding 37, to the other end of the tube 26. The end member 34 has an extension 38 rigidly connected at 39 to a link 40 which is pivoted at 41 to the steering tiller 15. An extension 43 is provided on the outer tube and connected at a pivot 44 to a link 45 which is pivoted at 46 to the rear end of the steering cable 19 after it has passed through the horizontal pivot tube 22. By means of the link 45 and steering cable 19, the steering control provided by the steering wheel 18 is connected to longitudinally move the first member 25. By means of the link 40, the second elongated member 26 is connected as a steering output to steer the outboard motor 13. A slidable seal 47 acts between the bar 27 and end member 34, a slidable seal 48 acts between the end member 34 and the outer tube or first member 25, and a slidable seal 49 acts between the first member 25 and the bar 27. These seals keep out dirt and moisture and help retain lubrication within the steering mechanism 11.

The actuator block 36 establishes a bidirectional no-kickback linkage acting among the first, second and third members. Wedge means 52 include first and second wedge surfaces 53 and 54 in the actuator block 36, which is secured to and may be considered a part of the second tubular member 26. These wedge surfaces 53 and 54 are established at about a 15° angle relative to the longitudinal axis 55 of the steering mechanism 11. These wedge surfaces are conveniently formed as circular arcs and, even more conveniently, may be formed by holes drilled completely through the actuator block 36. These first and second wedge surfaces 53 and 54 are oppositely sloping relative to this longitudinal axis 55. Lock means are provided to cooperate with the wedge means 52 and in this embodiment the lock means includes lock elements 57 and 58, shown as rollers, to cooperate with the wedge surfaces 53 and 54, respectively, and also both of these lock elements cooperate with the third elongated element 27. Spring means 60 are provided in the form of two compression springs acting in a generally longitudinal direction and relatively urging into engagement the lock means 57 and 58 and the wedge surfaces 53 and 54 to transversely wedge the rollers 57 and 58 between the wedge surfaces and the elongated bar member 27. The springs 60 are disposed in pockets 61. The spring means 60 effectively frictionally locks together the second and third members 26 and 27 so that wave action or torque reaction on the outboard motor 13 and acting on the second member 26 cannot react on the steering wheel 18.

Figure 5:
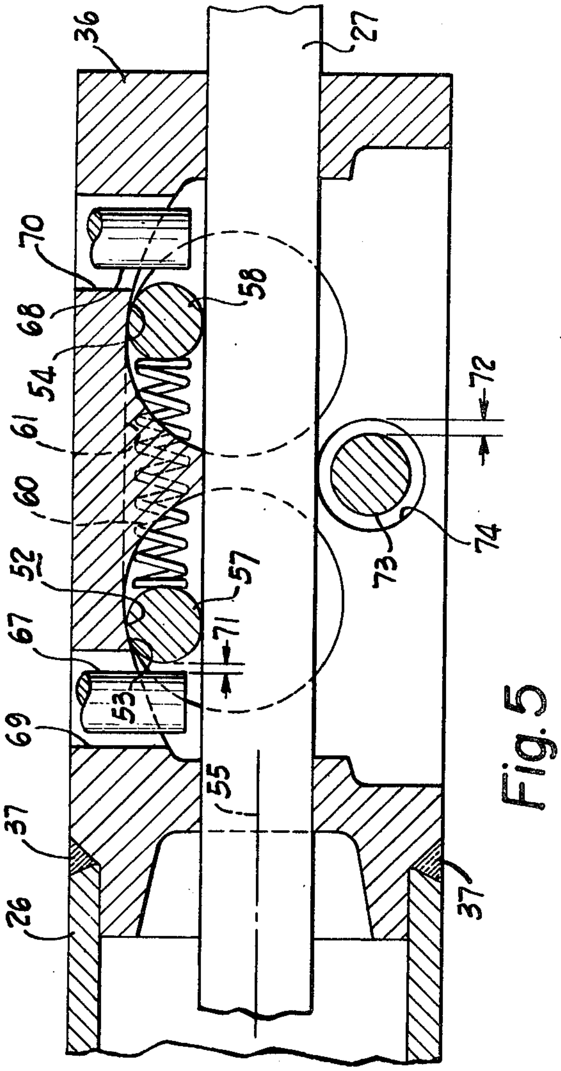
FIG. 5 is an enlarged partial view similar to FIG. 3.
Figure 4:
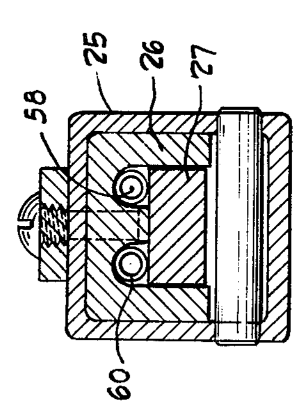
FIG. 4 is a sectional view on line 4—4 of FIG. 3.

Trip means 65 has first and second trip surfaces 67 and 68. This trip means 65 is movable longitudinally in accordance with the movement of the first member 25 and this is effected by having the trip means in the form of cantilevered studs 67 and 68 secured in the first tube 25 as by threading, and extending into longitudinally elongated slots 69 and 70, respectively, in the acutator block 36. As urged by the spring means 60, a portion of the periphery of the lock rollers 57 and 58 extends longitudinally beyond the wall of the elongated slots 69 and 70. In a neutral position, as shown in FIG. 5, the trip studs 67 and 68 have a small first lost motion distance 71 between the trip surface and the respective lock roller 57 or 58. A drive pin 73 extends transversely through an enlarged aperture 74 in the actuator block 36 and is secured in the outer first elongated member 25. In the neutral position shown in FIG. 5, the drive pin 73 is spaced from the surface of the elongated aperture 74 by a second lost motion distance 72 in the longitudinal direction. This second lost motion distance is greater than the first lost motion distance 71. This drive pin 73 and enlarged aperture 74 provide actuator surfaces acting between the first and second members 25 and 26.

OPERATION

The steering mechanism 11 may be utilized in many vehicles in which there is a steering control input, such as the steering wheel 18, used to provide a steering output, for example, to the steering tiller 15 to steer the vehicle 12. In many vehicles, for example, in an automobile, there are occasions when the road wheels attempt to transmit back to the steering wheel a torque reaction, for example, when one tire becomes flat or is running in deep snow. In an outboard motor boat, wave action or torque reaction attempts to be transmitted from the steering tiller 15 back to the steering wheel 18. The steering mechanism 11 of the present invention prevents such reverse direction of force transmission. Moving the steering wheel 18 in either direction moves the first member 25 which is capable of moving the second member 26 to turn the steering tiller 15. However, attempts by the outboard motor 13 to transmit a force back to the steering wheel 18 are prevented in the steering mechanism 11, characterized as a bidirectional no-kickback drive mechanism. The reason that the steering tiller 15 acting on the second member 26 cannot move the first member 25 is because the second member 26 is frictionally locked to the third member 27 by the wedge means 52 and lock means 57, 58, and this third member 27 is restrained against longitudinal movement. FIG. 1 illustrates that this third member 27 may have a partial arcuate movement about the pivot 29, which is fixed to the boat. As the outboard motor 13 is turned about its pivot 21, the forward end at pivot 41 of the steering tiller 15 moves in an arc about this pivot 21. The link 45 maintains connection between the cable 19 and the first member 25 despite this arcuate movement.

If now the steering wheel 18 is rotated clockwise, this pushes on the steering cable 19 and moves the link 45 and outer first member 25 to the right in FIGS. 2 and 3. In FIGS. 3 and 5, it will be noted that this moves the trip means 65, and more specifically moves the trip surface 67 into engagement with the lock or roller 57. In the neutral condition, the second and third members 26 and 27 are frictionally locked together by the spring means 60 pushing the lock rollers 67 and 68 longitudinally outwardly to wedge them at the wedge surfaces 53 and 54 between the actuator block 36 and the third member 27. Now that the trip surface 67 moves to the right, this engages the lock roller 57 after it has moved through the first lost motion distance 71. Subsequent movement to the right unlocks the second and third members 26 and 27. As soon as the second lost motion distance 72 has been overcome, the drive pin 73 engages the longitudinal end of the enlarged aperture 74 and this positively drives the second member 26 to the right along with the rightward movement of the first member 25.

When the rightward urging on the first member 25 ceases, the spring means 60 will again urge the lock roller 57 into engagement with the wedge surface 53 to again frictionally lock together the second and third members 26 and 27. Accordingly, no force reaction from the outboard motor 13 may be transmitted to the steering wheel 18.

When the steering wheel 18 is rotated in a counterclockwise direction, this pulls on the steering cable 19 and moves the first member 25 to the left in FIGS. 2 and 3. When the trip surface 68 moves through the first lost motion distance 71, this unlocks the second and third members 26 and 27 by moving the lock roller 58 away from the wedge surface 53. Then when the drive pin 73 has moved through the second lost motion distance 72, it engages the surface of the enlarged aperture 74 to provide a positive drive to the left of the actuator block 36 and, hence, the second member 26, to rotate the outboard motor clockwise about its pivot 21.

It will be noted that the first and second wedge surfaces 53 and 54 are unitary with the actuator block 36, whereas, the lock elements 57 and 58 are rollers which are separate from these wedge surfaces. Forming these wedge surfaces 53 and 54 as parts of circular arcs, and more specifically as parts of two bored holes through the actuator block 36, provides an easy and inexpensive way to form such wedge surfaces. In the proportions shown, the wedge surfaces are established at about 15° angle relative to the longitudinal axis 55, which has been found in practice to be a practical angle which eliminates any jamming or chatter as the frictional lock is released, especially with overhauling loads. The first and second elongated members 25 may be formed from steel tubes, for example, and the third member from a steel bar, which are readily available and easily machined into the steering mechanism 11, which may be used either in original equipment manufacture or retrofitted to existing vehicles, such as out-board motor boats. The first and second members 25 and 26 are both tubular, with one telescoping within the other, and in the embodiment shown, the second member 26 is telescoped within the first member 25.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A steering mechanism for a vehicle comprising, in combination a steering control, a first elongated member connected by linkage to be moved generally longitudinally by movement of said steering control, a second elongated member at least partially longitudinally movable relative to said first member, a steering output connected to said second member and connected to steer the vehicle, a third elongated member extending longitudinally relative to said second member, linkage means connected to the vehicle to restrain said third member from longitudinal movement, wedge means having first and second oppositely sloping wedge surfaces, lock means, including at least one lock element, disposed to engage said first and second wedge surfaces, spring means acting in a generally longitudinal direction and relatively urging into engagement said lock means and said first and second wedge surfaces to relatively transversely wedge between said second and third elongated members to frictionally lock together said second and third members, first and second oppositely disposed trip surfaces movable longitudinally with said first member and engageable, after moving a first lost motion distance, to relatively unlock said wedge means and lock means between said second and third members, and actuator surfaces acting between said first and second members and engageable upon said first member longitudinally moving a second lost motion distance, which is greater than said first lost motion distance, whereby movement in a first direction of said steering control moves said first member in a first direction with said first trip surface moving through said first lost motion distance to unlock said second and third members and said actuator surfaces relatively moving through said second lost motion distance to thereafter move said second member in said first direction, and whereby movement in a second direction of said steering control moves said first member in a second direction with said second trip surface moving through said first lost motion distance to unlock said second and third members and said actuator surfaces relatively moving through said second lost motion distance to thereafter move said second member in said second direction.

2. A steering mechanism as set forth in claim 1, wherein said first and second wedge surfaces are integrally connected to one of said second and third members.

3. A steering mechanism as set forth in claim 1, wherein said first and second wedge surfaces are integrally connected to said second member.

4. A steering mechanism as set forth in claim 1, wherein said wedge means is unitary with said second member.

5. A steering mechanism is set forth in claim 1, wherein said first and second wedge surfaces are formed as circular arcs on one of said second and third members.

6. A steering mechanism as set forth in claim 1, wherein said first and second wedge surfaces are formed as portions of at least one circular aperture in said second member.

7. A steering mechanism as set forth in claim 1, wherein said lock means includes at least one roller element.

8. A steering mechanism as set forth in claim 1, wherein said lock means includes first and second roller elements cooperable with said first and second wedge surfaces, respectively.

9. A steering mechanism as set forth in claim 1, wherein said first and second members are tubular, with one telescoped within the other.

10. A steering mechanism as set forth in claim 1, wherein said first and second members are tubular with said second member telescoped within said first member, and said third member telescoped within said second member.

* * * * *